United States Patent
Jain

(10) Patent No.: US 10,015,622 B2
(45) Date of Patent: *Jul. 3, 2018

(54) TECHNIQUES FOR UPDATE PROCEDURE SIGNALING IN A WIRELESS NETWORK

(71) Applicant: Intel Corporation, Santa Clara, CA (US)

(72) Inventor: Puneet K. Jain, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/687,313

(22) Filed: Aug. 25, 2017

(65) Prior Publication Data

US 2017/0359673 A1    Dec. 14, 2017

Related U.S. Application Data

(63) Continuation of application No. 14/219,240, filed on Mar. 19, 2014, now Pat. No. 9,781,543, which is a
(Continued)

(51) Int. Cl.
*H04W 4/00* (2018.01)
*H04W 52/02* (2009.01)
(Continued)

(52) U.S. Cl.
CPC .......... *H04W 4/005* (2013.01); *H04B 17/318* (2015.01); *H04W 4/70* (2018.02);
(Continued)

(58) Field of Classification Search
CPC . H04W 4/005; H04W 48/20; H04W 52/0277; Y02D 70/00; Y02D 70/1222;
(Continued)

(56) References Cited

U.S. PATENT DOCUMENTS

2004/0185871 A1   9/2004   Somani et al.
2005/0135360 A1   6/2005   Shin et al.
(Continued)

FOREIGN PATENT DOCUMENTS

CN   101115239   1/2008
EP   1 962 520   8/2008
(Continued)

OTHER PUBLICATIONS

International Search Report and Written Opinion for PCT/US2011/046479, dated Jan. 11, 2012, 8 pages.
(Continued)

*Primary Examiner* — Asad Nawaz
*Assistant Examiner* — Saad A Waqas
(74) *Attorney, Agent, or Firm* — Schwabe, Williamson & Wyatt, P.C.

(57) ABSTRACT

Techniques are described that can be used for efficient mobility management signaling. In some cases, a network can specify an extended timer used for a machine to machine (M2M) type device to communicate with a network. The extended timer can be transmitted in connection with an attachment acceptance message, Location Updating Accept message, Tracking Area Update Accept, or Routing Area Update Accept message. In some cases, a timer can be adjusted using a multiplier in order to increase a period at which communications with the network occur. The network can transmit an indication to change a timer by multiplying the timer with the multiplier.

15 Claims, 4 Drawing Sheets

Related U.S. Application Data continuation of application No. 12/975,827, filed on Dec. 22, 2010, now Pat. No. 8,787,337.

(60) Provisional application No. 61/373,788, filed on Aug. 13, 2010.

(51) Int. Cl.

| | |
|---|---|
| *H04W 48/20* | (2009.01) |
| *H04B 17/318* | (2015.01) |
| *H04W 4/70* | (2018.01) |
| *H04W 16/32* | (2009.01) |
| *H04W 48/18* | (2009.01) |
| *H04W 8/06* | (2009.01) |

(52) U.S. Cl.
CPC ....... *H04W 48/20* (2013.01); *H04W 52/0277* (2013.01); *H04W 8/06* (2013.01); *H04W 16/32* (2013.01); *H04W 48/18* (2013.01); *Y02D 70/00* (2018.01); *Y02D 70/1222* (2018.01); *Y02D 70/1224* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/21* (2018.01)

(58) Field of Classification Search
CPC ........... Y02D 70/1224; Y02D 70/1242; Y02D 70/142; Y02D 70/164; Y02D 70/21
See application file for complete search history.

(56) References Cited

U.S. PATENT DOCUMENTS

| | | | |
|---|---|---|---|
| 2006/0094415 | A1 | 5/2006 | Veron |
| 2008/0268878 | A1 | 10/2008 | Wang et al. |
| 2009/0129342 | A1 | 5/2009 | Hwang et al. |
| 2009/0268635 | A1 | 10/2009 | Gallagher et al. |
| 2009/0310503 | A1 | 12/2009 | Tenny et al. |
| 2010/0056175 | A1 | 3/2010 | Bachmann et al. |
| 2010/0130237 | A1 | 5/2010 | Kitazoe et al. |
| 2010/0172336 | A1 | 7/2010 | Pehrsson et al. |
| 2010/0184458 | A1 | 7/2010 | Fodor et al. |
| 2010/0203865 | A1 | 8/2010 | Horn et al. |
| 2010/0210269 | A1 | 8/2010 | Shuai |
| 2011/0002267 | A1 | 1/2011 | Dwyer et al. |
| 2011/0170410 | A1 | 7/2011 | Zhao et al. |
| 2011/0195709 | A1 | 8/2011 | Christensson et al. |
| 2011/0217978 | A1 | 9/2011 | Horn |
| 2012/0034898 | A1 | 2/2012 | Tiwari |
| 2012/0039313 | A1 | 2/2012 | Jain |

FOREIGN PATENT DOCUMENTS

| | | |
|---|---|---|
| EP | 2111018 A1 | 10/2009 |
| KR | 1020050063823 | 6/2005 |
| WO | 200178032 A1 | 10/2001 |
| WO | 2009/152367 A1 | 12/2009 |
| WO | 2012021359 A1 | 2/2012 |

OTHER PUBLICATIONS

International Preliminary Report on Patentability for PCT/US2011/046479, dated Jan. 3, 2013, 6 pages.
Office Action for U.S. Appl. No. 12/975,827, dated Sep. 30, 2013, 44 pages.
Extended European Search Report for European Patent Application No. 11816831.9, dated Aug. 21, 2014, 7 pages.
Extended European Search Report for European Patent Application No. 14152802.6, dated Aug. 21, 2014, 7 pages.
Office Action for Chinese Patent Application 201180046877.9, dated Nov. 18, 2015, 23 pages.
Extended European Search Report for European Patent Application No. 14152851.3, dated Dec. 1, 2014, 7 pages.
Office Action for Chinese Patent Application No. 201180046877.9 dated Feb. 4, 2015, 17 pages of which 10 are an English translation.
Office Action dated Jan. 11, 2016 from U.S. Appl. No. 14/219,240, 28 pages.
Office Action for Chinese Patent Application 201310425578.7, dated Oct. 21, 2015, 21 pages.
Final Office Action dated Jun. 30, 2016 from U.S. Appl. No. 14/219,240, 24 pages.
Office Action for Chinese Patent Application Serial No. 201180046877.9, dated May 10, 2016, 8 pages.
Advisory Action dated Oct. 19, 2016 from U.S. Appl. No. 14/219,240.
Office Action issued by Chinese Patent Office for Patent Application No. 201310425578.7 dated Jun. 15, 2016; 19 pages.
Office Action dated Dec. 6, 2016 from U.S. Appl. No. 14/219,240, 23 pages.
Fourth Office Action dated Oct. 31, 2016 from Chinese Patent Application No. 201180046877.9, 20 pages.
Article 94(3) dated Feb. 13, 2017 from European Patent Application No. 11816831.9, 4 pages.
Article 94(3) dated Apr. 11, 2017 from European Divisional Application No. 14152802.6, 4 pages.
Article 94(3) dated Apr. 26, 2017 from Second European Divisional Application No. 14152851.3, 4 pages.
Notice of Allowance dated Jun. 7, 2017 from U.S. Appl. No. 14/219,240, 25 pages.
Extended Tracking Area Update Timer, 3GPP TSG_CT WG1 Meeting #67, C1-104431, Current version 10.0.0, Revision 2, Oct. 11-15, 2010, 10 pages.
"3rd Generation Partnership Project; Technical Specification Group Services and System Aspects; General Packet Radio Service (GPRS) enhancements for Evolved Universal Terrestrial Radio Access Network (E-UTRAN) access, 3GPP TS 23.401 V10.1.0, Release 10, Sep. 2010, 271 pages.".
"3rd Generation Partnership Project; Technical Specification Group Services and System Aspects; General Packet Radio Service (GPRS); Service description; Stage 2", 3GPP TS 23.060 V10.1.0, Release 10, Sep. 2010, 310 pages.
"3rd Generation Partnership Project; Technical Specification Group Core Network and Terminals; Mobile radio interface Layer 3 specification; Core network protocols; Stage 3", 3GPP TS 24.008 V10.0.0, Release 10, Sep. 2010, 617 pages.
"Section 5.3.4 Handling of the periodic tracking area update timer and mobile reachable timer (S1 mode only)", 3GPP TS 24.301 V8.0.0, Release 8, Dec. 2008, p. 38.
"Section 5.3.4 Handling of timer T3402", 3GPP TS 24.301 V8.0.0, Release 8, Dec. 2008, p. 39.
"3rd Generation Partnership Project; Technical Specification Group Core Network and Terminals; Non-Access-Stratum (NAS) protocol for Evolved Packet System (EPS); Stage 3", 3GPP TS 24.301 V10.1.0, Release 10, Dec. 2010, 305 pages.
3rd Generation Partnership Project; Technical Specification Group GSM/EDGE Radio Access Network; Mobile radio interface layer 3 specification; Radio Resource Control (RRC) protocol, 3GPP TS 44.018 V10.0.0, Release 10, Sep. 2010, 429 pages.
3GPP TS 24.008 V9.3.0 (Jun. 2010), 3rd Generation Partnership Project; Technical Specification Group Core Network and Terminals, Mobile radio interface Layer 3 specification, Core network protocols, Stage 3, Release 9, Jun. 14, 2010, 611 pages.
Intel, "Periodic LAU/RAU/TAU Optimizations for Signaling Congestion Control", 3GPP TSG SA WG2 Meeting #79E (Electronic), Jul. 6-13, 2010, Elbonia, TD S2-103223, XP50458293, 4 pages.
3GPP TS 24.008 V9.3.0, 3rd Generation Partnership Project; Technical Specification Group Core Network and Terminals; Mobile radio interface Layer 3 specification; Core network protocols; Stage 3 (Release 9), Jun. 30, 2010, Section 4.7.2, Section 4.7.5.1.6, Section 4.7.5.2, 7 pages.

(56) References Cited

OTHER PUBLICATIONS

3GPP TR 23.888V0.4.1(Jun. 2010); "Technical Specification Group Services and System Aspects; System Improvements for Machine-Type Communications; (Release 10)," 53 pages.
3GPP TR 23.888V0.5.1(Jul. 2010); "Technical Specification Group Services and System Aspects; System Improvements for Machine-Type Communications; (Release 10)," 75 pages.
Intel, "Periodic LAU/RAU/TAU Optimizations for Signalling Congestion Control," 3GPP TSG SA WG2 Meeting #79E (Electronic), TD S2-103150, Agenda Item: 2.2, Jul. 6-13, 2010, Elbonia, 2 pages.
Sharp, "Flexible DRX Control in LTE," 3GPP TSG-RAN WG2, R2-071247, Agenda Item: 5.2.3, Mar. 26-30, 2007, St Julian's, Malta, 2 pages.
"3GPP, ""Technical Specification Group GSM/EDGE Radio Access Network; Mobile radio interface layer 3 specification;Radio Resource Control (RRC) protocol (Release 9),"" 3GPP TS 44.018 V9.5.0 (Jun. 2010), Jun. 14, 2010, Global System for Mobile Communications GSM, 429 pages".

|   | 8 | 7 | 6 | 5 | 4 | 3 | 2 | 1 |   |
|---|---|---|---|---|---|---|---|---|---|
| | \multicolumn{8}{c|}{Control Channel Description IEI} | octet 1 |
| | MSCR | ATT | \multicolumn{3}{c|}{BS-AG-BLKS-RES} | \multicolumn{3}{c|}{CCCH-CONF} | octet 2 |
| | 0 spare | \multicolumn{2}{c|}{CBQ3} | \multicolumn{2}{c|}{0 0 spare} | \multicolumn{3}{c|}{BS-PA-MFRMS} | octet 3 |
| | \multicolumn{8}{c|}{T3212 time-out value} | octet 4 |
| | \multicolumn{8}{c|}{Octet 5 (optional)} | |

TECHNIQUES FOR UPDATE PROCEDURE SIGNALING IN A WIRELESS NETWORK

CROSS-REFERENCE TO RELATED APPLICATION

This application is a continuation of U.S. application Ser. No. 14/219,240, filed Mar. 19, 2014, entitled "TECHNIQUES FOR UPDATE PROCEDURE SIGNALING IN A WIRELESS NETWORK," which is a continuation of U.S. patent application Ser. No. 12/975,827, filed Dec. 22, 2010, entitled "TECHNIQUES FOR MANAGING MOBILITY MANAGEMENT SIGNALING IN A WIRELESS NETWORK," now issued as U.S. Pat. No. 8,787,337 on Jul. 22, 2014, which claims the benefit of U.S. Provisional Patent Application No. 61/373,788, filed Aug. 13, 2010. The contents of which are hereby incorporated by reference in their entireties herein.

FIELD

The subject matter disclosed herein relates generally to techniques for establishing timers for network communication.

RELATED ART

Devices such as refrigerators, televisions, and coffee makers use networks to communicate with other devices. Machine to Machine (M2M) communication refers to the exchange of data between devices. M2M communication can be used for areas such as security (e.g., surveillance systems), asset tracking (e.g., fleet management, asset tracking, pay as you go, navigation), payment (e.g., point of sales and vending machines), metering (e.g., power, gas, water, and smart grid control), health care (e.g., remote diagnostics), and other consumer devices (e.g., digital photo frame, digital camera, net books, tablets, book readers, set top boxes, and gaming consoles).

If many of these M2M devices, including embedded/connected consumer devices, attach or roam in existing wide area wireless networks (e.g., 3rd Generation Partnership Project (3GPP) Long Term Evolution (LTE) or IEEE 802.16) then the existing wireless networks may become burdened with congestion. It is therefore desirable to provide a solution for signaling congestion and overload control due to devices that perform M2M communications attaching and communicating with the network.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Figure 1:
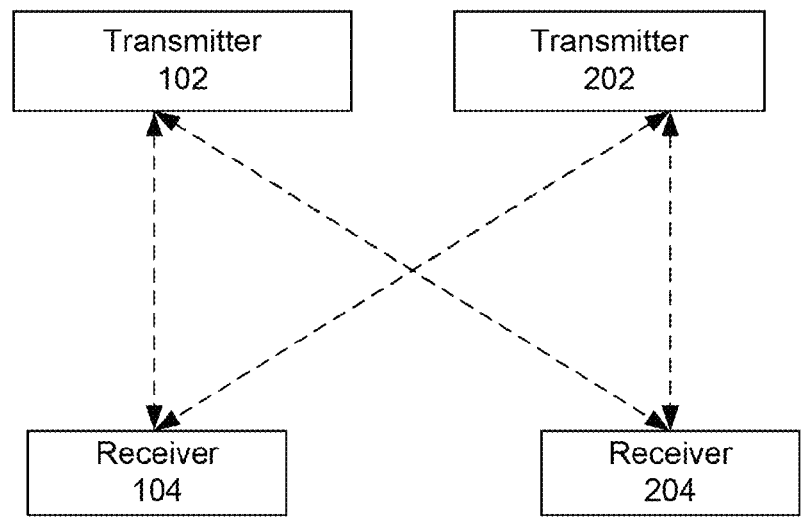
FIG. 1 depicts an example of devices connected using a wireless network.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11 h, 802.11i, 802.11n, 802.16, 802.16d, 802.16e, 802.16m, 3GPP standards, physical layer description of 3GPP LTE advanced 36211 release 10, and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. In addition, embodiments can be used for M2M devices and applications.

Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency Division Multiple Access (OFDMA), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks.

Many devices involved in M2M communications can use a network in limited ways. For example, M2M devices can be low mobility, involve time controlled network-use, are time tolerant, are packet switched (PS) only, utilize small data transmissions, use mobile originated communications only, and communicate based on a location-specific trigger. For example, devices that use M2M for smart metering have characteristics of being low-mobility, low-power use, low data transmission use, and time tolerance. Various embodiments potentially provide a solution for efficient of Mobility Management (MM) procedures for M2M devices. Various embodiments potentially provide signaling congestion and overload control mechanisms for M2M and/or human to human (H2H) devices. H2H devices can include, but are not limited to, mobile phones, smart phones, and radios that allow communication among people. Various embodiments potentially provide a manner for low-mobility and low-power consuming M2M devices to connect with a network while reducing load to the network.

Various embodiments provide methods to optimize MM procedures (e.g., periodic location/routing/tracking area update procedures) at least for low-mobility and/or low-power consuming M2M devices using at least 3GPP compliant networks (e.g., GSM, GPRS, EDGE, UMTS, HSUPA, HSDPA, HSPA, and LTE) and/or other wireless networks. 3GPP LTE is described in 3GPP LTE Rel-8 (2008) specifications as well as variations thereof. Various embodiments can provide a signaling congestion and overload control mechanism for a network due to attachment of roaming/non-roaming M2M devices. In some cases, various embodiments can also apply to some H2H devices (e.g., in circuit switched domain) to potentially optimize MM, signaling congestion, and overload control procedures.

Periodic updating may be used to periodically notify the availability of the mobile station to the network. 3GPP TS 24.008 and 3GPP TS 24.301 V10.0.0 (2010) specify mobility management procedures for devices that involve periodic Location Area Update (LAU), periodic Routing Area Update (RAU), and periodic tracking area update (TAU) procedures. 3GPP TS 24.008 and 3GPP TS 24.301 V10.0.0 (2010) also describe communications of International Mobile Subscriber Identity (IMSI) attach procedures. IMSI attach procedures can be used when a device is powered-on so that the device can register with a network. Those procedures can be used to periodically notify the availability of user elements (UE) to the network. In general, TS 24.008 provides L3/NAS specification for pre-LTE 3GPP systems (e.g., GSM, GPRS, EDGE, UMTS, and HSPA) whereas TS 24.301 provides L3/NAS procedures for LTE.

For example, in the UE, timing of periodic LAU procedures can be controlled by the timer T3212. T3212 is broadcast in the L3-RR SYSTEM INFORMATION TYPE 3 message on the BCCH, in the CONTROL CHANNEL DESCRIPTION Information Element (IE) (specified in 3GPP TS 44.018 subclause 10.5.2.11). In general, TS 44.018 provides RRC specification for pre-LTE 3GPP systems (i.e., GSM, GPRS, EDGE, UMTS, and HSPA) and can be used as a reference for L3 system broadcast messages. Various embodiments provide an efficient method for periodic LAU for low-mobility devices to optimize MINI signaling or to reduce network congestion. In some embodiments, for periodic LAU procedures, a UE can be programmed or configured with a T3212_Multiplier. Alternatively, in some embodiments, T3212_Multiplier or T3212_Multiplier_Indication can be sent by the network inside CONTROL_CHANNEL DESCRIPTION IE of an L3-RR SYSTEM INFORMATION TYPE 3 message.

In various embodiments, the T3212_Multiplier can be used to increase a period at which periodic LAU occurs by calculating the new extended T3212 timer value by multiplying the T3212_Multiplier with the T3212 timer received in L3-RR SYSTEM INFORMATION TYPE 3 message. In some embodiments, a T3212_Multiplier or a new extended T3212 timer can be configured at an HSS/HLR and downloaded to network (e.g., MSC/SGSN) as part of an Insert Subscriber Data procedure and then transmitted by the network to a UE in a LOCATION AREA UPDATE ACCEPT message. In some embodiments, a T3212_Multiplier or a new extended T3212 timer can be directly configured at network (MSC/SGSN) and transmitted to a UE in a LOCATION AREA UPDATE ACCEPT message. In some embodiments, a maximum value of the new extended timer T3212 can be 310 hours, although other maximum values can be defined.

The frequency of a periodic RAU procedure is controlled in the UE by the periodic Routing Area (RA) update timer, T3312. The value of timer T3312 is transmitted to the UE in one or more of the messages ROUTING AREA UPDATE ACCEPT and/or ATTACH ACCEPT. T3312 is currently defined as type GPRS timer. Per current encoding (defined in TS 24.008), GPRS timer can have maximum value of 31 decihours. However, the maximum value limit is not efficient for low-mobility M2M devices. Various mechanisms for extending the T3312 timer are described herein. In some embodiments, the new extended T3312 timer can be stored in HLR/HSS as part of UE subscription data and downloaded to network (SGSN) as part of an Insert Subscriber Data procedure and then transmitted by the network (SGSN) to a UE in a ROUTING AREA UPDATE ACCEPT and/or ATTACH ACCEPT message. In some embodiments, the new extended T3312 timer can be directly configured at the network (e.g., SGSN) and then transmitted to a UE in a ROUTING AREA UPDATE ACCEPT and/or ATTACH ACCEPT message.

In some embodiments, new encoding values of T3312 timer can defined in order to extend the timer value beyond 31 decihours. The extension can be identified as T3312ext value. In some cases, T3312ext value can be 3 octets or 24 bits. For example, T3312ext value can be defined in a similar manner to that of GPRS Timer 3 of TS 24.008. Octet 3 of T3312ext value can be defined as follows: (a) bits 5 to 1 represent the binary coded timer value and (b) bits 8 to 6 define the timer value unit for the GPRS timer. For example, bits 8 to 6 can be defined as follows:

0 0 0 value is incremented in multiples of 10 minutes
   0 0 1 value is incremented in multiples of 1 hour
   0 1 0 value is incremented in multiples of 10 hours
   1 1 1 value indicates that the timer is deactivated.

Accordingly, a maximum value of T3312ext value can be 310 hours. However, the bits 8 to 6 can be redefined to include larger or smaller increments to enlarge or reduce the maximum value of T3312ext value. For example, values 011 and 100 can be defined for an increment larger than 10 hour increments.

The value of the timer can be unique within an RA. The timer T3312 can be deactivated so that UE performs no periodic RA by specifying an infinite value for the timer. If the timer T3312ext value can be provided by the network, then the MS shall use the timer T3312ext value as a periodic RAU timer. If the timer T3312ext value is not provided by the network, then the MS shall use the timer T3312 value as a periodic RAU timer (T3312).

The frequency of a periodic TAU procedure is controlled in the UE by the timer T3412. In various embodiments, the value of timer T3412 is transmitted to the UE in one or more of the TRACKING AREA UPDATE ACCEPT messages and/or ATTACH ACCEPT. T3412 is currently defined as of type GPRS timer. Per current encoding (defined in TS 24.301), GPRS timer can have maximum value of 31 decihours. The maximum value may not be efficient for low-mobility M2M devices. Various embodiments provide manners for extending the T3412 timer. In some embodiments, the new extended T3412 timer can be stored in HLR/HSS as part of UE subscription data and downloaded to network (e.g., SGSN/MME) as part of an Insert Subscriber Data procedure and then transmitted by the network (SGSN/MME) to a UE in a TRACKING AREA UPDATE ACCEPT and/or ATTACH ACCEPT message. In some embodiments, the new extended T3412 timer can directly configured at the network (e.g., SGSN/MME) and then transmitted to a UE in a TRACKING AREA UPDATE ACCEPT and/or ATTACH ACCEPT message.

In some embodiments, new encoding values of T3412 timer can be defined in order to extend the timer value beyond 31 decihours. The extension can be identified as T3412ext value. In some cases, T3412ext value can be 3 octets or 24 bits. The T3412ext value can be defined in a similar manner as that of T3312ext value. The UE can apply this timer in the list of tracking areas assigned to the UE. If the timer T3412ext value is provided by the network, then UE shall use the value in timer T3412ext value IE as a periodic TAU timer (T3412). If the timer T3412ext value IE is not provided by the network, then the UE shall use the value in timer T3412 value IE as a periodic TAU timer.

If the received timer contains an indication that the timer is deactivated or the timer value is zero, then the UE shall not perform a periodic updating procedure.

FIG. 1 depicts an example of devices connected using a wireless network. The network can be compliant with any variety of IEEE 802.16 or 3GPP LTE as well as variations and revisions thereof. In the downstream or downlink case, the generically-named transmitters 102 and/or 202 above may be interchangeably referred to as a base station (BS), Node B (NB), enhanced Node B (eNB), or access point (AP). In various embodiments, for the downlink, the transmitter can also be interchangeably referred to as network entities such as a Mobile Switching Center (MSC), Serving GPRS Support Node (SGSN), or Mobility Management Entity (MME). In this downlink case, the receivers 104 and/or 204 above may be interchangeably referred to as a mobile station (MS), subscriber station (SS), user equipment (UE), station (STA), machine-type communication (MTC) device, or machine-to-machine (M2M) device at the system level herein. Further, the terms BS, NB, eNB, AP, MSC, SGSN, and MME may be conceptually interchanged, depending on which wireless protocol is being used, so a reference to BS herein may also be seen as a reference to any of NB, eNB, AP, MSC, SGSN, and MME. Similarly, a reference to MS or SS herein may also be seen as a reference to any of UE, STA, an MTC device, or M2M device.

In various embodiments, each transmitter and receiver includes a non-access stratum (NAS) that can be used to transmit and interpret messages used to control timing of location area updates, routing area updates, and/or tracking area update.

Figure 2:
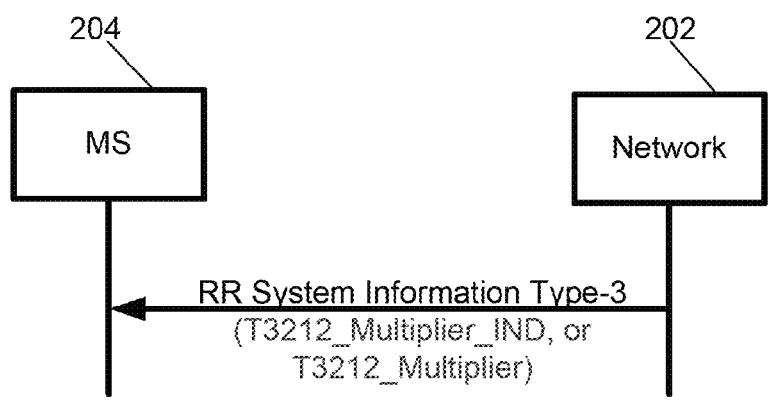
FIG. 2 depicts an example of a communication from a network to a mobile device to set a timing of Periodic Location Area Update procedures.

FIG. 2 depicts an example of a communication from a network to a mobile device to set a timing of Location Area Update procedures. The communication from network 202 can be transmitted using a base station controller (BSC), radio network controller (RNC), or another device.

MS 204 can be incorporated into a UE, an MTC device, an M2M device, or other types of devices. MS 204 uses a T3212 timer, T3212_Timer, to determine when to perform LAU procedures. T3212_Timer can be a periodic LAU timer with specific encoding applying to M2M devices. T3212_Timer can be provisioned in MS 204 and network 202. 3GPP TS 44.018 version 10.0.0 (2010) subclause 10.5.2.11 specifies that a value for T3212_Timer is broadcast in the L3-RR SYSTEM INFORMATION TYPE 3 message on the Broadcast Control Channel (BCCH) in the control channel description information element (IE). For circuit switched (CS) domain specific systems, a period of LAU procedures is the same for all the devices in a specific area because T3212 is broadcast in the L3-RR SYSTEM INFORMATION TYPE 3 message on the BCCH.

T3212 timeout value field can have a range between 0 to 255. The timer value 0 is used for infinite timeout value, i.e. periodic updating shall not be used within the cell.

In various embodiments, MS 204 can be programmed or configured with multiplier T3212_Multiplier. In some embodiments, MS 204 may obtain T3212_Multiplier by randomly selecting a value from a configured range. In some embodiments, network 202 transmits T3212_Multiplier in an octet 5 that can be added to a Control Channel Descriptor IE of L3-RR SYSTEM INFORMATION TYPE 3 message shown in FIG. 3. In some embodiments, T3212_Multiplier can be transmitted to MS 204 as part of LOCATION AREA UPDATE ACCEPT message. LOCATION AREA UPDATE ACCEPT message is described for example in TS 24.008 version 10.0.0 (2010), although other formats can be used. In some embodiments, the spare bits of octet 3 of Control Channel Descriptor IE of L3-RR SYSTEM INFORMATION TYPE 3 message can be used to transmit a T3212_Multiplier.

In some embodiments, it is desirable to have a longer/extended T3212 timeout period to reduce the frequency of periodic LAU. Network 202 can transmit to MS 204 an indication of whether to use T3212_Multiplier to increase an interval between periodic LAU. An indicator can be transmitted in spare bytes of Octet 3 of the communication of FIG. 3. The indicator can be 1 bit. The indicator can be positioned in bit 8 of octet 3, although other locations can be used. In cases where the timeout period is to be increased, MS 204 can multiply the T3212_Multiplier by timer T3212 to increase an interval between periodic LAU. In other words, MS 204 can use the longer/extended periodic LAU timer that is the product of timer T3212 with T3212_Multiplier. For example, after a device configured with multiplier of 2 receives an indication to use the multiplier, the device can change LAU from 10 updates per minute to 5 updates per minute. MS 204 can thereafter use the product of the T3212_Multiplier and the T3212 timer for the periodic LAU without further instruction from network 202.

Figures 3, 4:
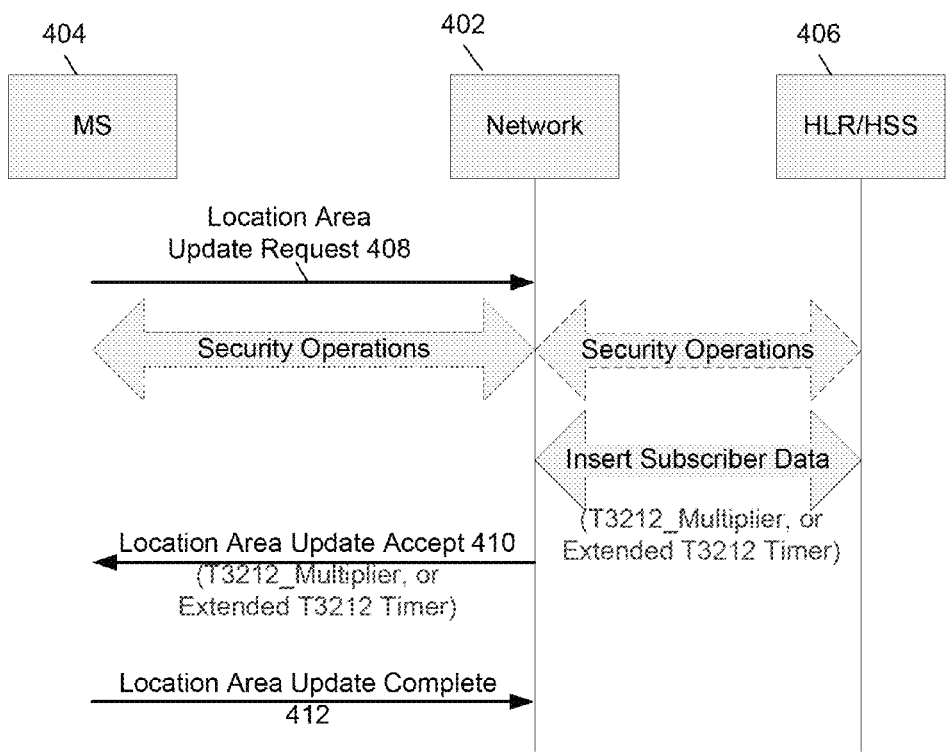
FIG. 3 depicts an example format of a communication transmitted from a network to a device that indicates whether the device is to adjust a Periodic Location Area Update timer using a multiplier.
FIG. 4 depicts an example manner that a mobile station can receive a Location Area Update timer multiplier from a network.

FIG. 3 depicts an example format of a communication transmitted from a network to a device that indicates whether the device is to adjust a periodic LAU timer using a multiplier. In particular, the format is a Control Channel Descriptor information element identifier (IEI) inside RR System Information Type 3 message. 3GPP TS 44.018 V10.0.0 (2010), section 10.5.2.11 describes RR System Information Type 3 message. Section 10.5.2.11 of 3GPP TS 44.018 V10.0.0 (2010) specifies use of octet 4 to transmit the T3212 time-out value. Octet 5 can be added to communicate an extended T3212 timer or T3212_Multiplier. The extended T3212 timer can be defined in a similar manner as that of T3312ext value by using one or more octets.

FIG. 4 depicts an example manner that an MS can receive a periodic LAU timer from a network. At 408, MS 404 can transmit a LOCATION AREA UPDATE REQUEST message to network 402. A suitable format of a LOCATION AREA UPDATE REQUEST is described for example in TS 24.008 section 9.2.15, although other formats can be used. Network 402 can include one or more computing devices that interact with MS 404 and HLR/HSS 406. Network 402 can include an MSC, SGSN, or other device. MSC or SGSN can receive the LOCATION UPDATE REQUEST message. The SGSN is responsible for the delivery of data packets from and to the mobile stations within its geographical service area. The SGSN can perform packet routing and transfer, mobility management (attach/detach and location management), logical link management, and authentication and charging functions.

Home location register/home subscription server (HLR/HSS) 406 can perform security operations involving network 402 and MS 404. Security operations and insertion of subscriber data are authentication operations that make sure a device is permitted to use network and are described generally in TS 24.008 as well as TS 23.060. In addition, HLR/HSS 406 can maintain subscription information concerning MS 404 as well as other devices attached to network 402. In some embodiments, subscription information can include fields that store the periodic LAU, RAU, and TAU timer values for MS 404.

Network 402 determines whether MS 404 is a low mobility device or not. Network 402 can determine that MS 404 is a low mobility device by subscription information in an HLR/HSS that indicates whether MS 404 is a low mobility device. Subscription information can be supplemented to indicate that MS 404 is a low mobility type device. In some cases, MS 404 can inform network 402 that MS 404 is a low mobility using a field that can be added to a LOCATION AREA UPDATE REQUEST or ATTACH REQUEST message specified in section 9.4.1 of TS 24.008, although other formats can be used. The field can be one (1) bit. A network administrator can identify subscription information as associated with a low mobility device.

After performing security operations and updating subscriber information, at 410, network 402 transmits a LOCATION AREA UPDATE ACCEPT message to MS 404. The LOCATION AREA UPDATE ACCEPT message can be modified to include a multiplier for a low mobility device. Section 9.2.13 of TS 24.008 describes LOCATION AREA UPDATE ACCEPT message content, although other formats can be used. In various embodiments, LOCATION AREA UPDATE ACCEPT message content is modified to include a field T3212_Multiplier, which stores a multiplier. Field T3212_Multiplier can be 1 octet or 8 bits. However, the T3212_Multiplier field can be other sizes. In various embodiments, each MS can receive a different multiplier value or the same multiplier value. In various embodiments, the multiplier can increase linearly with increasing binary values. In some cases, the multiplier can increase exponentially or in a quadratic manner.

For example, using a procedure of FIG. 2, MS 404 can use a periodic LAU timer that is a product of the multiplier and a programmed timer value.

In some embodiments, periodic timer T3212 can be added to LOCATION AREA UPDATE ACCEPT message to transmit a new extended periodic LAU timer to an MS. An extended periodic LAU timer can be transmitted in 3 octets or 24 bits. The extended periodic LAU timer can be defined in a similar manner as that of T3312ext value.

Figure 5:
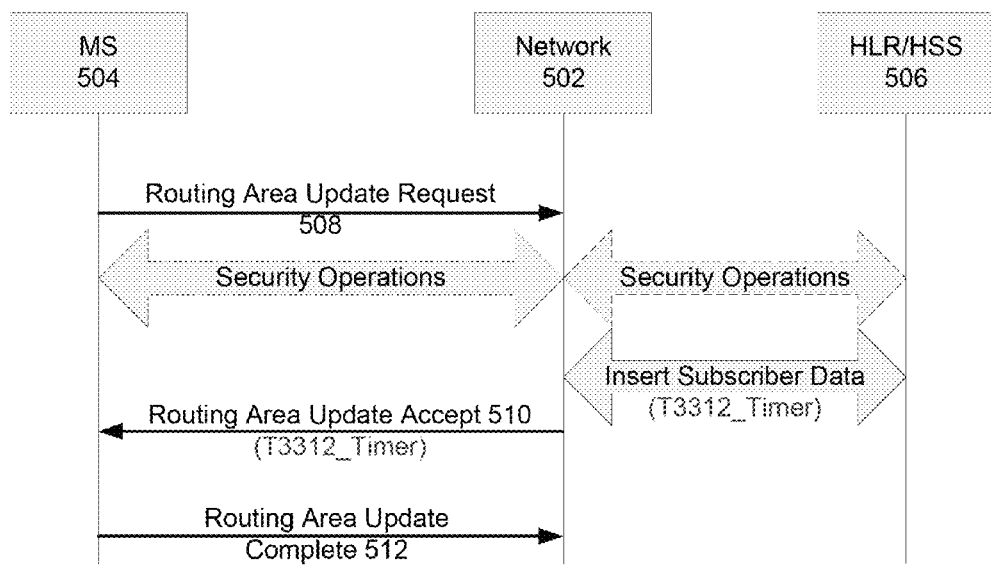
FIG. 5 depicts a procedure for setting a Periodic Routing Area Update Timer as part of routing area updates.

FIG. 5 depicts a procedure for setting a timer for routing area updates. At 508, MS 504 issues a ROUTING AREA UPDATE REQUEST to network 502. Network 502 can include one or more SGSN that interact with MS 504 and HLR/HSS 506. A format of a ROUTING AREA UPDATE REQUEST is described in section 9.4.14 of TS 24.008 (2010), although other formats can be used. Security operations, subscriber data insertion, and/or determination of whether a device is low mobility can take place in a similar manner as described with regard to FIG. 4. At 510, a ROUTING AREA UPDATE ACCEPT message is transmitted from network 502 to MS 504. ROUTING AREA UPDATE ACCEPT message is described in section 9.4.15 of TS 24.008 (2010), although other formats can be used. An extended periodic RAU timer for RAU can be added to the ROUTING AREA UPDATE ACCEPT message as T3312ext value. T3312ext value can be 3 octets or 24 bits. Other sizes of the extended periodic RAU timer can be used. Each timer can be sent from HLR/HSS 506 to MS 504 through network 502. In some cases, SGSN of network 502 can decide the extended periodic RAU timer.

Accordingly, by transmitting an extended periodic RAU timer for routing area updates, the time period between each periodic RAU can be increased. Using the extended periodic RAU timer, the time period can be increased beyond 31 decihours. By contrast, not using the extension timer makes the maximum time to be 31 decihours.

Figure 6:
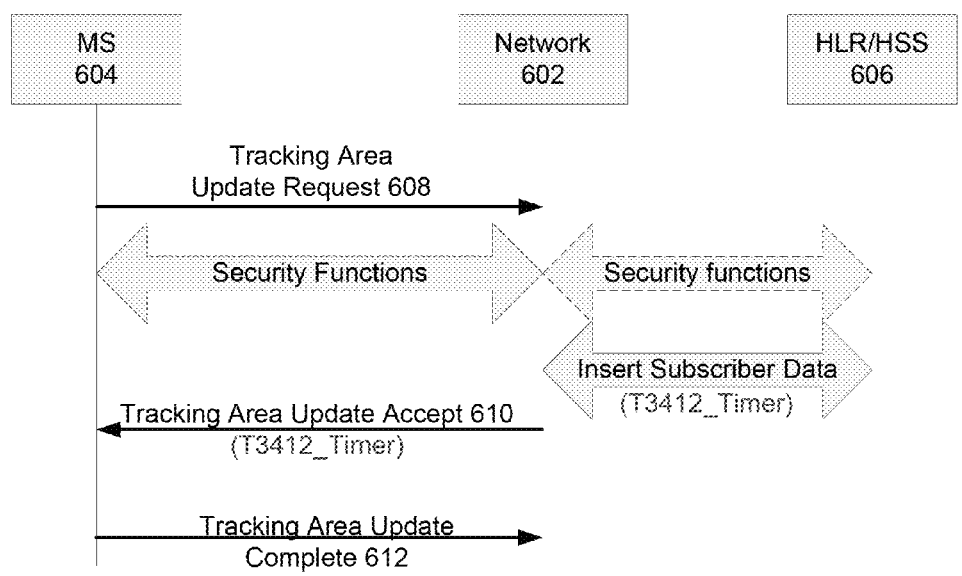
FIG. 6 depicts a procedure for setting a Periodic Tracking Area Update timer as part of tracking area updates.

FIG. 6 depicts a procedure for setting a timer for tracking area updates. Network 602 can include one or more SGSN and/or MME that interact with MS 604 and HLR/HSS 606. At 608, MS 604 issues a TRACKING AREA UPDATE REQUEST to network 602. A format of TRACKING AREA UPDATE REQUEST is described in TS 24.301 version 10.1.0 (2010), although other formats can be used. Security operations, subscriber data insertion, and/or determination of whether a device is low mobility can take place in a similar manner as described with regard to FIG. 4. At 610, a TRACKING AREA UPDATE ACCEPT message is transmitted from network 602 to MS 604. A format of TRACKING AREA UPDATE ACCEPT is described in 3GPP TS 24.301 (2010). An extended periodic TAU timer for TAU can be added to the TRACKING AREA UPDATE ACCEPT message as T3412ext value, although other formats can be used to transmit T3412ext value. T3412ext value can be 3 octets or 24 bits, although other values can be used. Each timer can be sent from HLR/HSS 606 to MS 604 through network 602. In some cases, MME of network 602 can decide the timer.

Accordingly, by transmitting an extended periodic TAU timer for tracking area updates, the time period between each periodic TAU can be increased. Using the extended periodic timer, the time period can be increased beyond 31 decihours. By contrast, not using the extended periodic TAU timer makes the maximum time to be 31 decihours. The extended periodic TAU timer can be defined in a similar manner as that of T3312ext value.

An attach procedure can occur when powering-on an MS or when an MS enters a network. The MS registers with the network to receive services that require registration. In an attach procedure, the MS transmits an attach request to the network and the network affirms the attach request with an attach accept message. Section 5.3.4 of 3GPP TS 24.301 version 8.0.0 (2008) specifies that an attach accept message can include a timer T3412 that can be used to time periodic TAU update operations. Currently, however, under 3GPP TS 24.008 version 10.0.0 (2010), the GPRS timer can be at most 31 decihours. When many mobile stations use the network for machine-to-machine communications, the network can become overloaded with traffic. It may be desirable to increase the time between timed communications from mobile stations to the network. Various embodiments provide a manner to communicate extension timers using attach accept messages. Extension timers can specify a longer time period between communications to a network.

Figure 7:
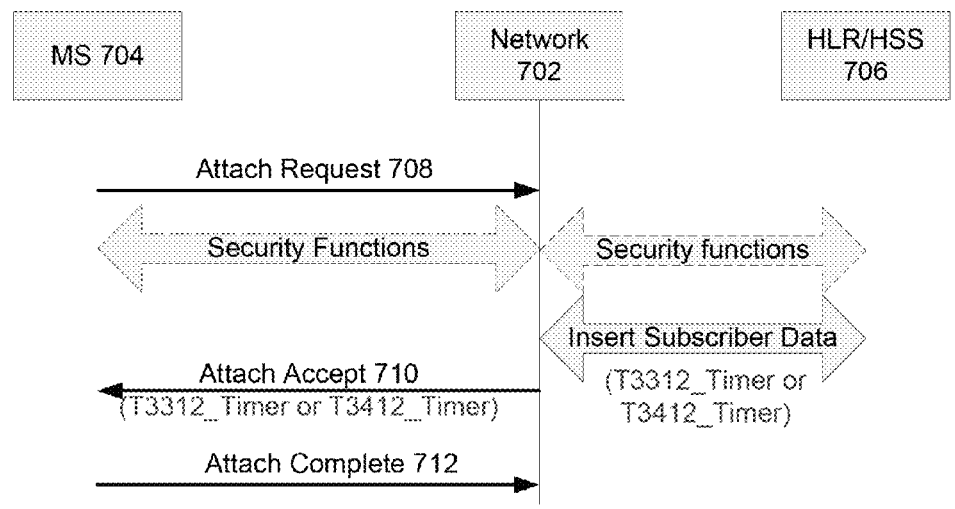
FIG. 7 depicts a procedure that can be used to transmit a Periodic Routing Area Update Timer or Periodic Tracking Area Update Timer as part of an attach procedure.

FIG. 7 depicts a procedure that can be used to transmit a timer for periodic routing area updates in connection with an attach procedure. At 708, to commence an attach procedure, MS 704 issues an attach request to network 702. A format of an ATTACH REQUEST for UMTS/HSPA is described for example at section 9.4.1 of TS 24.008 (2010). An SGSN of network 702 can receive the ATTACH REQUEST message.

Security operations, subscriber data insertion, and/or determination of whether a device is low mobility can take place in a similar manner as described with regard to FIG. 4. At 710, an ATTACH ACCEPT message is transmitted from network 702 to MS 704. ATTACH ACCEPT message is described at section 9.4.2 of TS 24.008 (2010). In various embodiments, the ATTACH ACCEPT message can be modified to include T3312ext value for periodic RAU, although other formats can be used to transmit T3312ext. T3312ext value can be 3 octets or 24 bits.

At 712, MS 704 can transmit an ATTACH COMPLETE message to network 702 to indicate completion of attachment. For example, a format of an ATTACH COMPLETE message is described in section 9.4.3 of TS 24.008 (2010).

The procedure of FIG. 7 can also be used to transmit a timer for periodic TAU in connection with an attach procedure. At 708, to commence an attach procedure. MS 704 issues an ATTACH REQUEST message to network 702. An ATTACH REQUEST message for LTE is described for example in TS 24.301 (2010). An MME or SGSN in network 702 can receive the ATTACH REQUEST message. An MME can be a control-node for the LTE access-network. The MME can be responsible for idle mode UE (User Equipment) tracking and paging procedure including retransmissions. The MME can be involved in the bearer activation/deactivation process and is also responsible for choosing the serving gateway S-GW/SGSN for a UE at the initial attach and at time of intra-LTE handover involving Core Network (CN) node relocation.

Security operations, subscriber data insertion, and/or determination of whether a device is low mobility can take place in a similar manner as described with regard to FIG. 4. At 710, an ATTACH ACCEPT message is transmitted from network 702 to MS 704. ATTACH ACCEPT message is described in TS 24.301 (2010). In various embodiments, the ATTACH ACCEPT message can be modified to include T3412ext value for periodic TAU, although other formats can be used to transmit T3412ext value. T3412ext value can be 3 octets or 24 bits.

At 712, MS 704 can transmit an ATTACH COMPLETE message to network 702 to indicate completion of attachment. For example, a format of an ATTACH COMPLETE message is described in TS 24.301 (2010).

For packet switched domain specific systems, periodic RAU or TAU frequency can be controlled per device. In some cases, the maximum value for T3312 or T3412 can be 31 decihours. Given the large number of MTC devices that may be deployed in future, this may still result in quite a bit signaling overhead. Some embodiments attempt to increase a maximum time of T3312/T3412 by changing units used for timer values. In some embodiments, binary coding can be added to indicate a GPRS timer value is incremented in a multiple of 10 hours, 100 decihours, days, or other durations.

Timers T3312 and T3412 can be transmitted using a GPRS timer value. GPRS Timer can be specified in subclause 10.5.7.3 of TS 24.008. GPRS Timer can be transmitted in a type 3 information element that is 2 octets in length. Octet 1 represents GPRS timer IE. In octet 2, bits 1 to 5 represent the binary coded timer value and bits 6 to 8 define a unit of the timer value. In some embodiments, the timer value unit can be increased beyond decihour to a 24 hour period. Accordingly, in some embodiments, the maximum timer value can be increased from 31 decihours to 31 days. However, if the timer value unit is increased, then the timer can be increased even more.

In some embodiments, bits 6 to 8 define the timer value unit for the GPRS timer as follows:

| Bits | | | |
|---|---|---|---|
| 8 | 7 | 6 | |
| 0 | 0 | 0 | value is incremented in multiples of 2 seconds |
| 0 | 0 | 1 | value is incremented in multiples of 1 minute |
| 0 | 1 | 0 | value is incremented in multiples of decihours |
| 0 | 1 | 1 | value is incremented in multiples of 10 hours |
| 1 | 0 | 0 | value is incremented in multiples of 24 hours |
| 1 | 1 | 1 | value indicates that the timer is deactivated. |

For example, two timer increments can be added that are specified by 011 and 100. Other increments of timers can be used. Another increment can be added for value 110.

Of note, the Mobile Reachable timer of TS 24.008 (2010) can be derived from location update timer T3212, routing area update timer T3312ext, or tracking update timer T3412ext. Corresponding to T3312/T3412 in MS, networks also starts Mobile Reachable timer which by default is 4 minutes greater than T3312/T3412.

Figure 8:
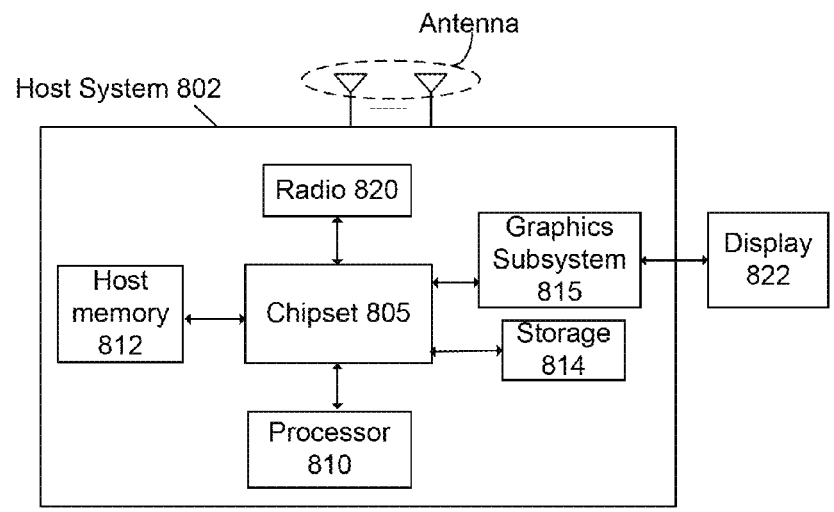
FIG. 8 provides an example of a system in accordance with an embodiment.

FIG. 8 provides an example of a system in accordance with an embodiment. The system can be used in an MS, UE, MTC device, netbook, handheld computer, handheld phone, and so forth. Computer system 800 may include host system 802 and display 822. Computer system 800 can be implemented in a handheld personal computer, mobile telephone, set top box, or any computing device. Any type of user interface is available such as a keypad, mouse, touch screen, and/or gesture or motion recognition. Host system 802 may include chipset 805, processor 810, host memory 812, storage 814, graphics subsystem 815, and radio 820. Chipset 805 may provide intercommunication among processor 810, host memory 812, storage 814, graphics subsystem 815, and radio 820. For example, chipset 805 may include a storage adapter (not depicted) capable of providing intercommunication with storage 814.

Processor 810 may be implemented as Complex Instruction Set Computer (CISC) or Reduced Instruction Set Computer (RISC) processors, x86 instruction set compatible processors, multi-core, or any other microprocessor or central processing unit. In various embodiments, processor 810 can be configured with instructions to perform techniques described herein.

Host memory 812 may be implemented as a volatile memory device such as but not limited to a Random Access Memory (RAM), Dynamic Random Access Memory (DRAM), or Static RAM (SRAM). Storage 814 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Graphics subsystem 815 may perform processing of images such as still or video for display. An analog or digital interface may be used to communicatively couple graphics subsystem 815 and display 822. For example, the interface may be any of a High-Definition Multimedia Interface, DisplayPort, wireless HDMI, and/or wireless HD compliant techniques. Graphics subsystem 815 could be integrated into processor 810 or chipset 805. Graphics subsystem 815 could be a stand-alone card communicatively coupled to chipset 805.

Radio 820 may include one or more radios capable of transmitting and receiving signals in accordance with applicable wireless standards such as but not limited to any version of IEEE 802.11 and IEEE 802.16. For example, radio 820 may include at least a physical layer interface and media access controller. Radio 820 can include a baseband processor to perform techniques described herein.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. An apparatus comprising:
   a physical layer interface to provide physical layer processing of messages to be transmitted or received over a wireless network; and
   a processor coupled with the physical layer interface to:
   generate a routing area update request or an attach request to include an indicator to cause a network to provide the apparatus with an extended timer value, the routing area update request or attach request to be transmitted by the physical layer interface;
   identify the extended timer value from an accept message received in response to the routing area update request or attach request;
   determine a value of a timer based on the extended timer value; and
   perform a routing area update procedure or an attach procedure based on the value of the timer,
   wherein the timer is a T3312 timer or a T3412 timer and the accept message includes the extended timer value in an octet with bits 1-5 of the octet to represent a binary-coded timer value and bits 6-8 of the octet to define a unit of the extended timer value, wherein the unit is an increment greater than 10 hours.

2. The apparatus of claim 1, wherein the accept message is a routing area update accept message and the processor is to generate the routing area update request to include the indicator and perform the routing area update procedure based on the value of the timer.

3. The apparatus of claim 1, wherein the accept message is an attach accept message and the processor is to generate the attach request to include the indicator and perform the attach procedure based on the value of the timer.

4. The apparatus of claim 1, wherein the extended timer value is a first extended timer value and the processor is further to:
   determine the value of the timer based on the first extended timer value instead of a second extended timer value received in a broadcast transmission.

5. A user equipment (UE) comprising:
   means to transmit, in a routing area update request or an attach request, an indicator to cause a network to provide the UE with an extended timer value;
   means to receive, in an accept message, the extended timer value;
   means to determine a value of a timer based on the extended timer value; and
   means to perform a routing area update procedure or an attach procedure based on the value of the timer,
   wherein the timer is a T3312 timer or a T3412 timer and the accept message includes the extended timer value in an octet with bits 1-5 of the octet to represent a binary-coded timer value and bits 6-8 of the octet to define a unit of the extended timer value, wherein the unit is an increment greater than 10 hours.

6. The UE of claim 5, wherein the accept message is a routing area update accept message and the UE is to transmit the indicator in the routing area update request and perform the routing area update procedure based on the value of the timer.

7. The UE of claim 5, wherein the accept message is an attach accept message and the UE is to transmit the indicator in the attach request and perform the attach procedure based on the value of the timer.

8. The UE of claim 5, wherein the extended timer value is a first extended timer value and the means to determine the value of the timer is further to:
determine the value of the timer based on the first extended timer value instead of a second extended timer value received in a broadcast transmission.

9. An apparatus comprising:
means to receive, in a routing area update request or an attach request transmitted by a user equipment (UE), an indicator; and
means to transmit, in an accept message, an extended timer value based on the indicator, wherein the extended timer value is to be used to determine a value of a timer for a performance of a routing area update procedure or an attach procedure,
wherein the timer is a T3312 timer or a T3412 timer and the accept message includes the extended timer value in an octet with bits 1-5 of the octet to represent a binary-coded timer value and bits 6-8 of the octet to define a unit of the extended timer value, wherein the unit is an increment greater than 10 hours.

10. The apparatus of claim 9, wherein the accept message is a routing area update accept message and the apparatus is to receive the indicator in the routing area update request.

11. The apparatus of claim 9, wherein the accept message is an attach accept message and the apparatus is to receive the indicator in the attach request.

12. An apparatus comprising:
a physical layer interface to process a message that includes a routing area update request or an attach request transmitted by a user equipment (UE); and
processing circuitry coupled with the physical layer interface, to:
identify an indicator in the routing area update request or attach request; and
generate an accept message to include an extended timer value based on the indicator,
wherein the extended timer value is to be used to determine a value of a timer for a performance of a routing area update procedure or an attach procedure and the physical layer interface is to cause transmission of the accept message,
wherein the timer is a T3312 timer or a T3412 timer and the accept message includes the extended timer value in an octet with bits 1-5 of the octet to represent a binary-coded timer value and bits 6-8 of the octet to define a unit of the extended timer value, wherein the unit is an increment greater than 10 hours.

13. The apparatus of claim 12, wherein the accept message is routing area update accept message and the apparatus is to receive the indicator in the routing area update request.

14. The apparatus of claim 12, wherein the accept message is an attach accept message and the apparatus is to receive the indicator in the attach request.

15. The apparatus of claim 12, wherein the extended timer value is a first extended timer value and the processing circuitry is further to:
cause a second extended timer value to be transmitted in a broadcast transmission.

* * * * *